Aug. 3, 1965

E. H. WISE ETAL 3,198,254

METHOD AND APPARATUS FOR COMPLETING WELLS

Filed May 8, 1962

INVENTORS.
EDWARD H. WISE
ARCHER W. KAMMERER, JR.
By Mellin and Hanscom
ATTORNEYS.

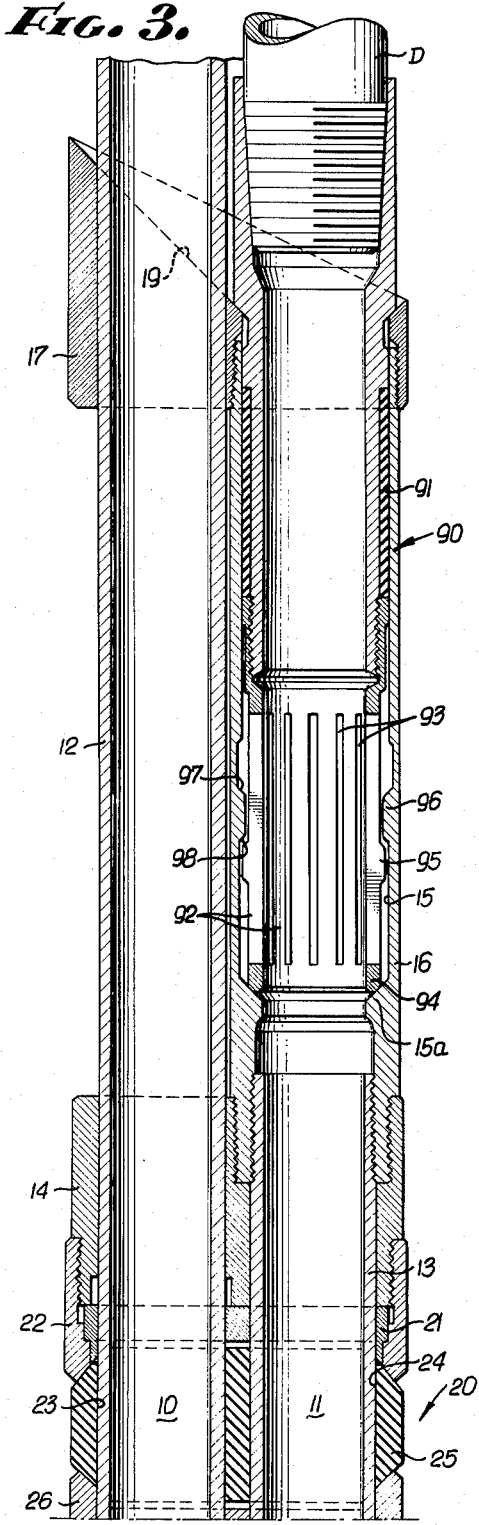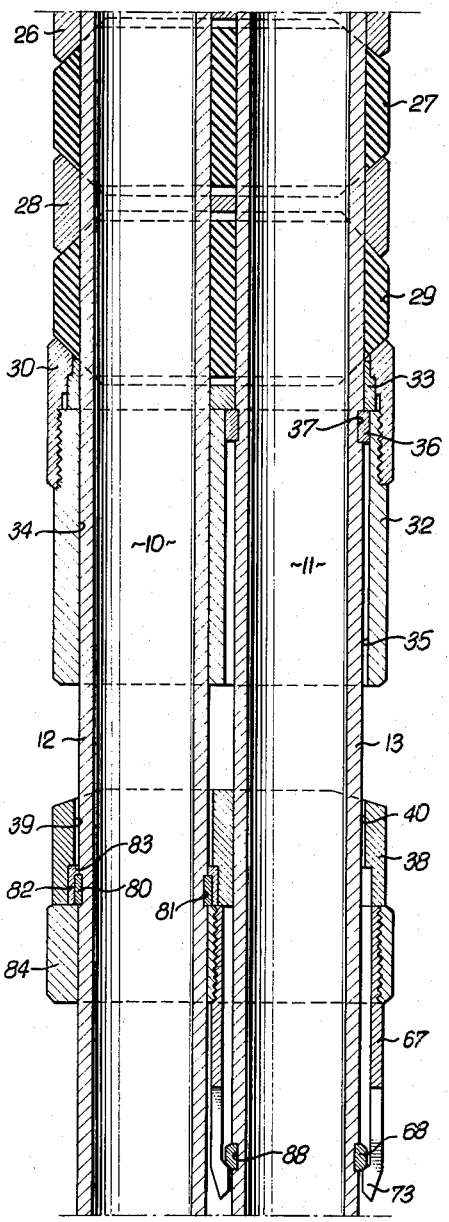

Aug. 3, 1965　　　E. H. WISE ETAL　　　3,198,254
METHOD AND APPARATUS FOR COMPLETING WELLS
Filed May 8, 1962　　　　　　　　　　　　　　6 Sheets-Sheet 3

INVENTORS.
EDWARD H. WISE
ARCHER W. KAMMERER, JR.

Mellin and Hanson
ATTORNEYS.

Aug. 3, 1965   E. H. WISE ETAL   3,198,254
METHOD AND APPARATUS FOR COMPLETING WELLS
Filed May 8, 1962   6 Sheets-Sheet 4

EDWARD H. WISE
ARCHER W. KAMMERER, JR.
INVENTORS.

BY
Mellin and Hanscom
ATTORNEYS.

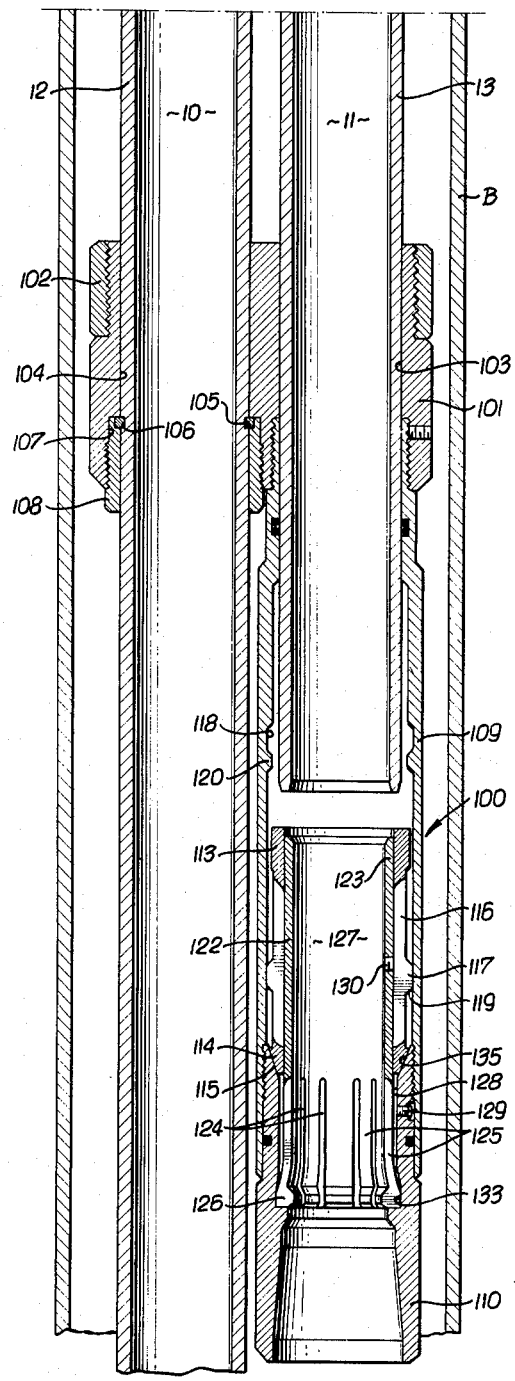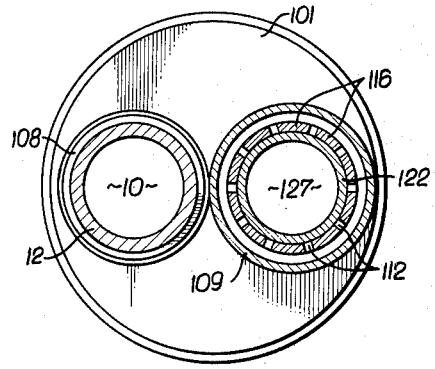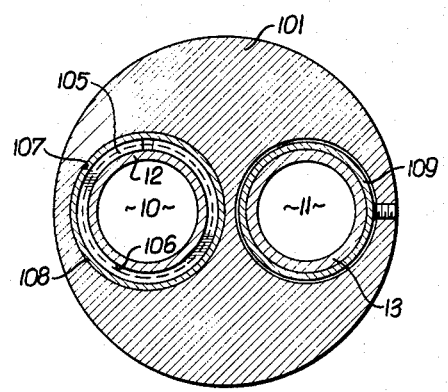
Edward H. Wise
Archer W. Kammerer, Jr.
INVENTORS

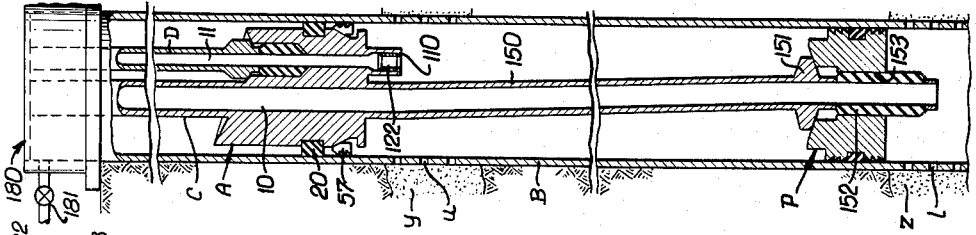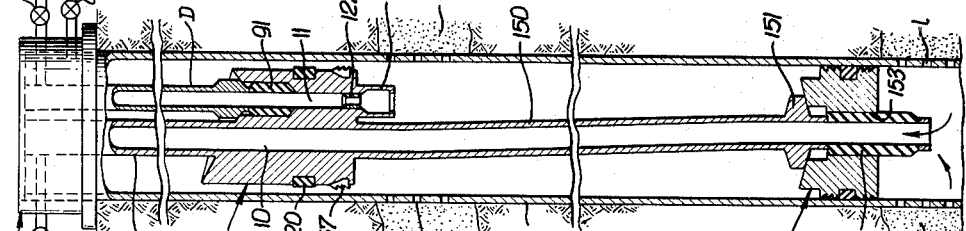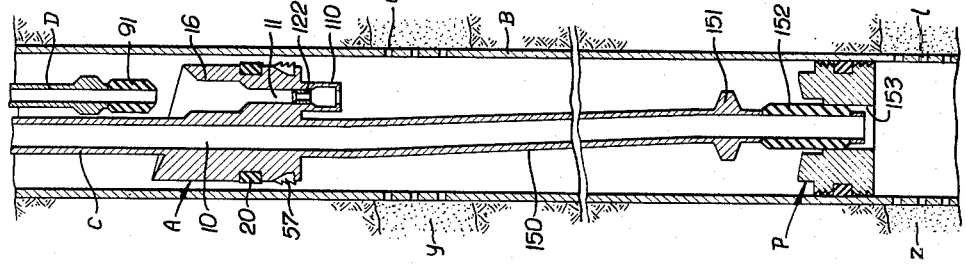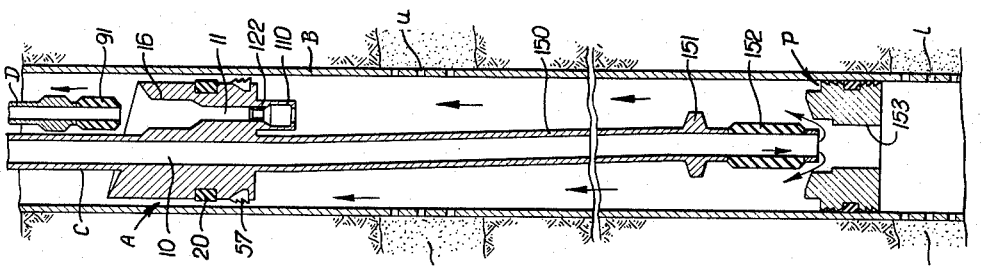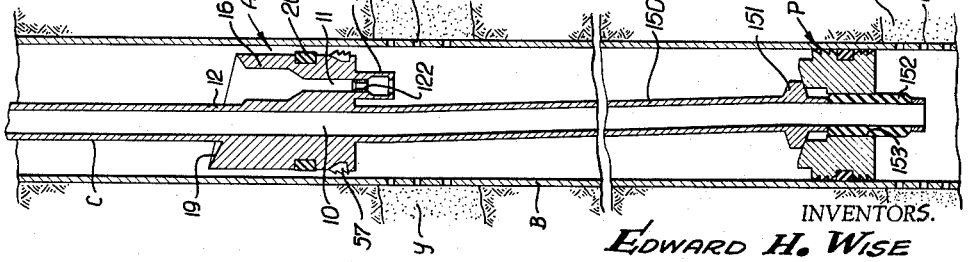

United States Patent Office 3,198,254
Patented Aug. 3, 1965

3,198,254
METHOD AND APPARATUS FOR
COMPLETING WELLS
Edward H. Wise, Lafayette, La., and Archer W. Kammerer, Jr., Fullerton, Calif., assignors to Baker Oil Tools, Inc., Los Angeles, Calif., a corporation of California
Filed May 8, 1962, Ser. No. 193,136
19 Claims. (Cl. 166—48)

The present invention relates to apparatus and methods for completing well bores, such as well bores having a single or a plurality of producing zones therein, through which production is to be conducted through a single or separate paths to the top of the well bore.

An object of the present invention is to provide improved packer apparatus adapted to be run in a well bore to its setting location, a tubular string being appropriately related to the packer apparatus, and in which setting energy can be stored in the tubular string prior to setting of the packer apparatus, after which surface connections with the tubular string can be completed at the top of the well bore to enable the latter to be conditioned while under control, after which the stored energy in the tubular string is releasable to set the packer without modifying the surface connections.

Another object of the invention is to provide packer apparatus adapted to be run on a first tubular string to its setting location and adapted to have at least a second tubular string connected to it, in which setting energy can be stored in one of the tubular strings prior to setting of the packer in the well bore, whereupon the surface connections with the tubular strings can be completed at the top of the well bore to enable the latter to be conditioned prior to packing off of the packer in the well bore, after which the stored energy in the one tubular string can be released to pack off the packer in the well bore without shifting the surface connections.

A further object of the invention is to provide improved packer apparatus of the natures above indicated, in which the well packer can be repeatedly released and reset, if desired. In fact, the well packer can be released and its parts releasably held in retracted position before its resetting is performed, to guard against inadvertent expansion of the packer parts.

An additional object of the invention is to provide an improved packer apparatus of the natures above indicated, in which some energy remains stored in the tubular string so that it constantly tends to maintain the well packer set in packed-off condition in the well bore.

Yet another object of the invention is to provide an improved method of completing a well having one or a plurality of producing zones therein, the well being maintained under control at the surface during its conditioning and prior to setting of a packer previously lowered therewithin, and also during the setting of the packer.

This invention possesses many other advantages and has other objects which may be made more clearly apparent from a consideration of a form and method embodying the invention. This form and method are shown and described in the present specification and in the drawings accompanying and constituting a part thereof. They will now be described in detail, for the purpose of illustrating the general principles of the invention; but it is to be understood that such detailed description is not to be taken in a limiting sense, since the scope of the invention is best defined by the appended claims.

Referring to the drawings:

FIGURES 1 and 1a together constitute a side elevational view of an apparatus embodying the invention, FIG. 1a constituting a lower continuation of FIG. 1;

FIG. 2 is an enlarged vertical section taken along the line 2—2 on FIG. 1;

FIGS. 3, 3a and 3b together constitute a longitudinal section through the apparatus disclosed in FIGS. 1 and 1a, FIG. 3a being a lower continuation of FIG. 3, and FIG. 3b being a lower continuation of FIG. 3a;

FIGS. 4, 4a and 4b are views corresponding to FIGS. 3, 3a and 3b, respectively, illustrating the packer anchored in packed-off condition in a well casing;

FIG. 7 is a cross-section taken along the line 7—7 on FIG. 3b;

FIG. 8 is a cross-section taken along the line 8—8 on FIG. 3b;

Figure 1:
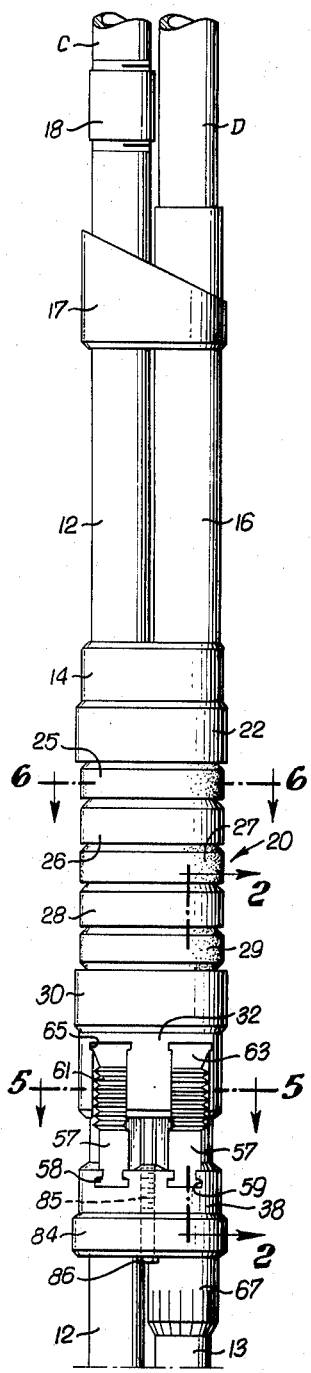
Figure 1A:
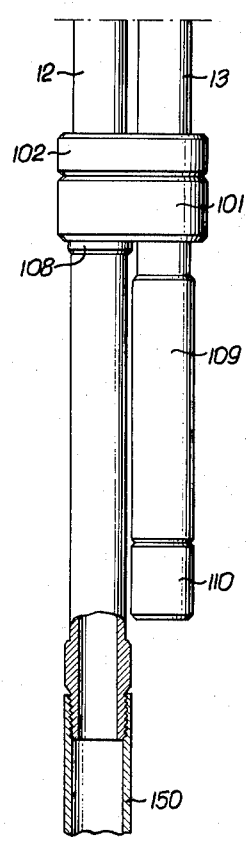
Figure 2:
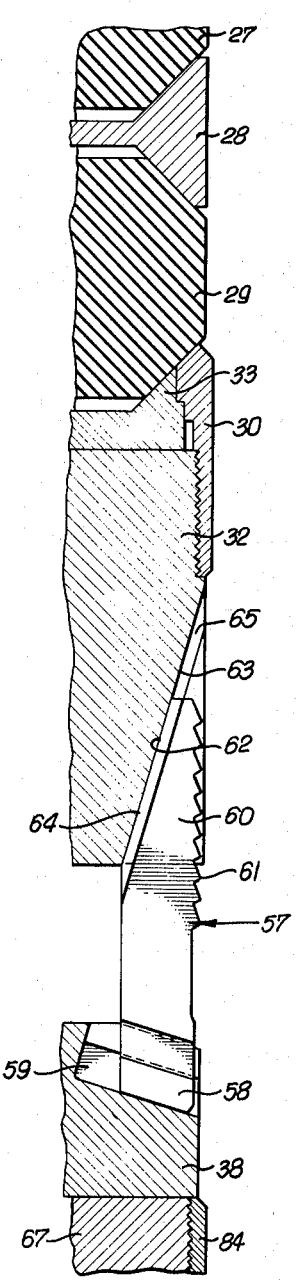

FIGS. 9 to 13, inclusive, are diagrammatic views illustrating different sequential steps in installing the packer apparatus of FIGS. 1 to 8, inclusive, in a well bore in conjunction with a lower well packer installed in the well bore.

A well packer apparatus A is shown in the drawings, which is adapted to be lowered in a well casing B on a first tubular string C, and which may be placed in proper association with a lower well packer P (FIGS. 9 to 13) previously set in the well casing. As shown, the well packer P is set above lower casing perforations 1 opposite a lower producing zone $z$; whereas, the well packer A is to be set above upper casing perforations $u$ located opposite an upper producing zone $y$, so that well production can be conducted from the lower zone $z$ through one tubular string C to the top of the well bore, and from the upper producing zone $y$ through another parallel tubular string D to the top of the well bore.

The well packer A has a plurality, such as a pair, of fluid passages 10, 11 therethrough, one of which 10 communicates with the first tubular string C, by means of which the apparatus is lowered in the well casing, and the other of which 11 communicates with the second tubular string D extending to the top of the well bore. The fluid derived from the well bore below the lower packer P may be conducted through the passage 10 and into the first tubular string C. The fluid derived from the upper production zone in the well bore between the packers A and P may flow through the passage 11 and through the other tubular string D to the top of the well bore.

The well packer includes a pair of parallel tubular body members or mandrels 12, 13, the first tubular body member 12 passing slidably through an upper connector 14, the second tubular body member or mandrel 13 also passing through the upper connector 14, but being threadedly attached thereto through the agency of its upper portion 16, which has a counterbore forming a receptacle 15 for the second tubing string D, the latter being adapted to be lowered in the well casing B and inserted therewithin. The upper portion 16 of the second tubular body member 13 is threadedly attached to a guide or head 17, the first tubular body member 12 extending through this guide and being suitably secured to the first tubular string C through the agency of a coupling 18. The guide or head 17 has a tapered guide surface 19, which diverges in an upward direction from a low point at the tubing receptacle 15 to a high point adjacent to the first tubular member 12. More specifically, such tapered guide surface 19 may be frusto-conical in shape, being developed about an axis coinciding with the axis of the second body member 13.

The first and second tubular body members or mandrels 12, 13 extend downwardly from the upper connector 14 and through a packing structure 20. This packing structure includes an upper insert 21 engaging the lower end of the upper connector 14 and clamped thereagainst by an upper gauge ring 22 threaded on the upper connector. The body members 12, 13 extend through parallel bores 23, 24 in an upper packing element 25, of pliant, elastic material, such as rubber, the upper end of this packing element engaging the lower end of the upper gauge ring 22 and its lower end engaging a spacer 26 through which the body members 12, 13 also pass. These body members successively pass downwardly through an intermediate packing element 27, of rubber or rubber-like material, a lower spacer ring 28, and a lower packing element 29, of rubber or rubber-like material. This lower packing element engages a lower gauge ring 30 threadedly attached to the upper end of a slip expander 32, the packing element also contacting a lower insert 33 clamped against the upper end of the expander 32 by the lower gauge ring 30. The lower insert 33 and expander 32 have parallel bores 34, 35 therethrough through which the tubular body members 12, 13 extend. The expander bore 35, through which the second tubular body member 13 extends, is larger in diameter than the second tubular body member to enable a retracting ring 36 to slide therewithin, which is mounted within a peripheral groove 37 in the second body member 13 and which is adapted to engage the lower insert 33 for the purpose of elevating the expander 32 when the second body member 13 is elevated in the well casing B.

Spaced below the expander 32 is a slip ring 38 having parallel bores 39, 40 through which the body members 12, 13 extend. The first body member 12 is connected to the slip ring 38 by a coupling ring 80 disposed in its peripheral groove 81, which is encompassed by a shear sleeve 82 fitting within the slip ring. This shear sleeve 82 has an upper inwardly directed shear flange 83 engaging the upper end of the coupling ring 80. Any upstrain on the first body member 12 is transmitted through its coupling ring 80 and shear flange 83 to the slip ring 38. The slip ring itself is attached to a slip ring retainer 84 by a plurality of longitudinally extending limit pins or screws 85 (FIG. 1), the lower head 86 of which engages the underside of the slip ring retainer 84 and the shank portion of which is threaded into the slip ring 38.

Displaced from a plane including the axes of the two tubular body members 12, 13, and on opposite sides thereof, are slips 57 carried by the slip ring 38 and adapted to coact with the expander 32. As shown, a pair of slips 57 is disposed on each side of the aforementioned central plane. Each slip is coupled to the slip ring 38 for longitudinal movement therewith, but the slips can move radially of the slip ring from a retracted position into engagement with the well casing B, and back to a retracted position. Thus, the lower portions of the slips are formed as T-shaped heads 58 slidably mounted in companion generally T-shaped slots 59 in the slip ring. The upper portions of the slips are constituted as anchoring member 60 having downwardly facing wickers or teeth 61 and inner tapered surfaces 62 inclined in a downward and inward direction, being slidable along companion tapered surfaces 63 in the expander 32. As the expander 32 moves downwardly relative to the slip ring 38 and the slips 57, the latter are shifted radially outwardly into engagement with the well casing B. Conversely, relative upward movement of the expander with respect to the slip ring and the slips will result in inward movement of the slips 57 from the well casing B. This occurs as a result of providing side tongues 64 on each slip parallel to its tapered surface 62, which ride in companion grooves 65 in the expander 32, forming a slidable tongue and groove connection between the expander and each slip and insuring positive retraction of the slips 57 when the expander 32 moves away from the slip ring 38.

Initially, the slips 57 and packing structure 20 are in their retracted positions, being retained in such positions during lowering of the packer apparatus A in the well casing by a releasable coupling or latch device 67, 68 which interconnects the second body member 13 with the retainer ring 84 and slip ring 38. A control or latch sleeve 67 is threadedly secured to the slip ring retainer 84 and is disposed around the second body member or mandrel 13. Its inwardly directed spring-like latch feet 73 are releasably located under a tapered actuator ring 68 mounted in a peripheral groove 88 in the second body member 13. When the actuator ring 68 is disposed above the latch feet 73, the second body member 13 is prevented from moving downwardly relative to the first body member 12. However, when the first body member is held from moving downwardly by the first tubular string C extending to the top of the well bore, the exertion of a sufficient downward force on the second body member 13 can cause its actuator ring 68 to expand the latch feet 73 out of the way; whereupon, the second body member 13 can move downwardly to set the well packer, as described hereinbelow.

The second tubular string D can be lowered in the well casing B after the well packer A has been lowered on the first tubular string C to its approximate setting location in the well casing above the upper perforations u. This second tubular string D is releasably latched in the upper portion of the second body or mandrel 13. The lower portion 90 of the second tubular string D can extend into the tubing receptacle 15 and has an annular rubber or rubber-like seal 91 thereon for sealing engagement with the wall of the receptacle. The lower portion of the second tubular string D is constituted as a releasable latch device, including a plurality of arms 92 formed by circumferentially spaced longitudinal slots 93. The lower ends of these arms 92 are integral with an annular portion 94 adapted to seat against a receptacle shoulder 15a. The intermediate portions of the arms have outwardly directed fingers 95 adapted to engage an inwardly directed shoulder 96 of the receptacle. When the lower portion 90 of the second tubular string D is inserted in the receptacle 15, the fingers 95 will engage the upper tapered surface 97 of the shoulder, which will deflect the arms inwardly until their fingers 95 ride past the shoulder and snap into the receptacle therebelow. Similarly, the taking of an upward strain on the second tubular string D of sufficient force will cause the lower tapered surface 98 of the shoulder to engage the fingers 95 and deflect the arms 92 inwardly until the fingers ride past the shoulder, thereby permitting withdrawal of the second tubular string from the receptacle.

In setting the well packer A, the slip ring 38 is prevented from moving downwardly by the first body member 12 and the first tubular string C connected thereto. The second tubular string D is mounted in the receptacle and a downward force imposed on it which is transferred through the shoulder 15a to the upper connector 14 and to the second body member 13. The downward force is also transmitted from the actuator 68 to the latch feet 73, expanding them outwardly and allowing the second body member 13 to move downwardly relative to the first body member 12. Since the slip ring 38 is prevented from moving downwardly by the coupling ring 80 on the first tubular string 12, the downward movement of the second tubular string D is transferred through the upper connector 14 and the entire packing structure 20 to the expander 32, moving the expander downwardly relative to the slips 57 and forcing the latter outwardly into anchoring engagement with the wall of the well casig B. A continuation of the movement of the upper connector 14 towards the expander 32 will then shorten the packing structure 20 and expand and compress the rubber or rubber-like packing elements 25, 27, 29 outwardly into sealing engagement with the wall of the well casing. With respect to the packing structure 20, the members 14, 21, 22 and the members 30, 32, 33 slidable on the body members 12, 13 constitute device for expanding the packing structure.

In the apparatus disclosed in the drawings, it is desired to prevent a downward force imposed on the second tubular string D from being capable of setting the well packer A against the wall of the well casing B. This is accomplished by a releasable locking unit 100 which prevents relative movement to occur between the first and second body members 12, 13 until such relative movement is purposely desired. As disclosed, the releasable lock unit includes a bottom connector 101 having an upper guide ring 102 threaded thereon and having first and second openings 103, 104 through which the first and second body members 12, 13 can pass. The first body member or mandrel 12 is secured to the bottom connector 101 by a split retainer ring 105 disposed in a peripheral groove 106 in the body member and extending outwardly against the base of a counterbore 107 in the lower end of the bottom connector. A retaining nut 108 encompasses the first body member 12 and is threaded into the counterbore 107 into snug engagement with the retaining ring 105, thereby securing the bottom connector to the first body member and against longitudinal movement relative thereto.

The second body member 13 is slidable through the bore 103 in the bottom connector 101 and extends within a tubular housing 109 threadably secured to the bottom connector. This tubular housing depends from the bottom connector and has its lower portion threadedly attached to a lower sub 110. The second body member 13 is initially prevented from moving downwardly within the bottom connector 101 and from moving downwardly relative to the first body member 12 by engaging the upper end of a thrust or latch sleeve 111 which has circumferentially spaced longitudinal slots 112 extending therethrough from an upper circumferentially continuous portion 113 to a lower circumferentially continuous portion 114 thereof, which has an outer tapered end or wedge surface 115. The slots 112 provide spring-like arms 116 between the upper and lower circumferentially continuous portions 113, 114 of the sleeve, from the intermediate portion of which latch fingers 117 extend in an outward direction, these fingers being received initially within a circumferential lock groove 118 in the housing, the lower tapered sides 119 of the latch fingers engaging a companion tapered flange or shoulder 120 extending inwardly of the housing 109 and forming the lower side of the groove 118, the direction of taper being in a downward and inward direction.

The downward force of the second body member 13 against the sleeve 111 tends to cause its latch fingers 117 to be cammed inwardly by the housing flange 120, so as to release the latch sleeve from the housing and enable it to shift downwardly. However, such inward shifting of the latch fingers is prevented by a holding sleeve 122 extending upwardly into the lower portion of the latch sleeve 111 and with its upper end 123 disposed behind the latch fingers 117, thereby preventing them from shifting inwardly. The holding sleeve 122 is circumferentially continuous along its upper portion 123 and has its lower portion provided with circumferentially spaced longitudinally extending slots 124 opening through its lower end to provide spring-like arms 125 terminating in inwardly directed feet or fingers 126. These fingers 126 are initially held in an inward position, to project partly within the holding sleeve passage 127, by an upper inner wall 128 of the lower sub 110, a shear screw 129 extending through the sub and under the lower end of the holding sleeve 122 to locate it in place. Upward movement of the holding sleeve to any significant extent is prevented by a shear screw 130 secured to the sleeve 122 and disposed immediately under the lower end of the latch sleeve 111, to prevent upward movement of the fingers 126 from the inner wall 128.

Figure 3B:
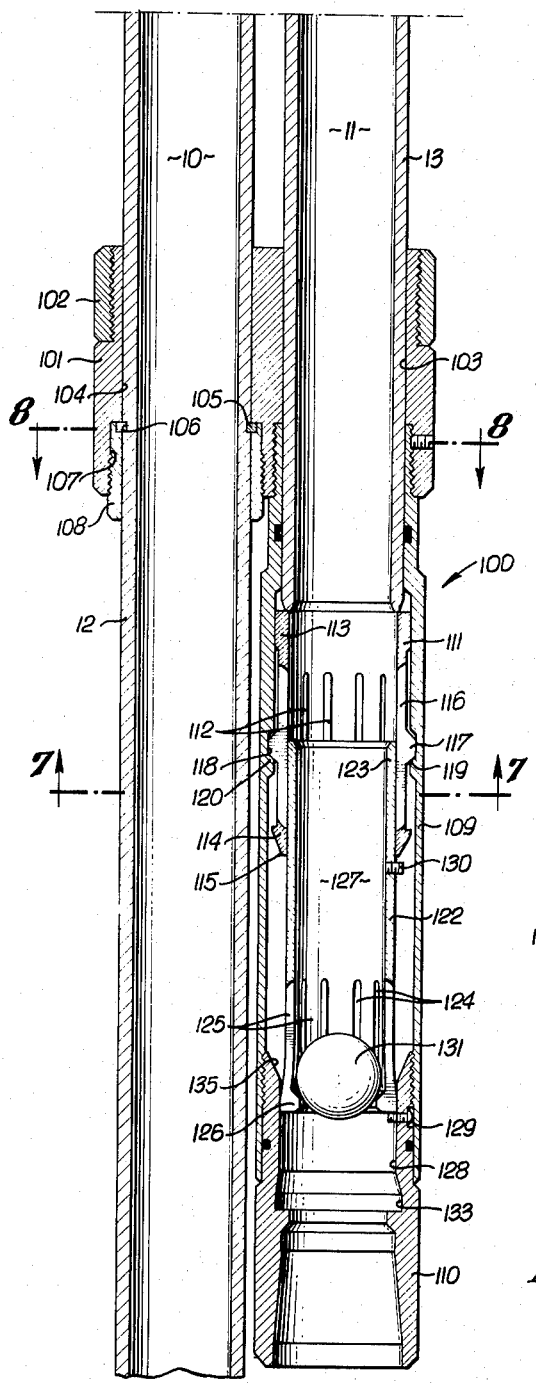
Figure 5:
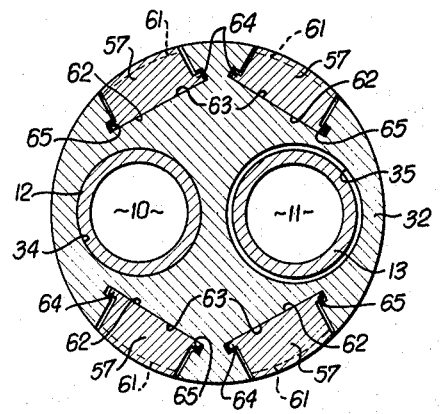
FIG. 5 is an enlarged cross-section taken along the line 5—5 on FIG. 1.
Figure 6:
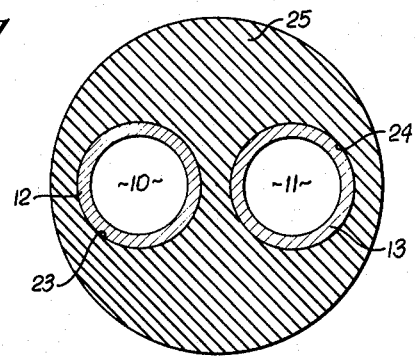
FIG. 6 is an enlarged cross-section taken along the line 6—6 on FIG. 1.

The fingers 126 project inwardly initially to provide a seat for a valve element 131, such as a trip ball, adapted to be dropped or pumped down the second tubular string D and through the second passage 11 into the holding sleeve 122, this ball having a diameter slightly greater than the retracted inside diameter of the fingers 126, and coming to rest thereagainst, such as disclosed in FIG. 3b. The application of pressure to the fluid in the second tubular string D and second passage 11 of a sufficient extent will exert a downward force on the trip ball 131 and the holding sleeve 122, which bears against the shear screw 129. When the hydraulic force overcomes the shear strength of the screw 129, the holding sleeve 122 is shifted downwardly in the housing 109 and its sub 110 until the fingers 126 come opposite a circumferential recess 133 in the sub, the fingers expanding outwardly into the recess, to increase their effective inside diameter, which will become greater than the diameter of the ball 131, the latter then being pumped through the fingers 126 and out of the sub 110 to drop harmlessly into the well bore. The downward shifting of the holding sleeve 122 from its position behind the latch fingers 117 allows sufficient downward force imposed on the second tubular string D and second body member 13 to cam the latch fingers 117 inwardly free from the retaining flange or shoulder 120, the support or latch sleeve 111 then moving downwardly under the impetus of the second body member 13 until its engages the shear screw 130, shearing the latter and continuing its downward movement until its lower tapered nose or wedge 114 enters a tapered socket 135 at the upper end of the sub 110, wedging into the latter and insuring against its inadvertent upward movement in the housing 109.

As a result of the release of the latch or lock sleeve 111, the second body member 13 can also exert sufficient downward force to cause its actuator ring 68 to engage the feet 73 and cam them laterally out of the way, the second body member then being capable of moving downwardly relative to the first body member 12, to expand the slips 57 and the packing structure 20 against the wall of the well casing.

In using the apparatus A, it can be lowered in the well casing B on the first tubular string C to the desired setting point in the well casing. The second tubular string D can then be lowered in the well casing alongside the first tubular string and appropriately mounted in its receptacle 15, such as disclosed in FIG. 3. At this time, the actuator ring 68 is disposed above the latch feet 73 and the releasable lock unit 100 is in its locked condition, as disclosed in FIG. 3b. The first tubular string C is maintained in tension to prevent downward movement of the slip ring 38 and the slips 57. A sufficient downward or compressive force is then imposed on the second tubular string D, which is more than ample to release the latch feet 73 and set the slips 57 and the packing structure 20 firmly against the wall of the well casing. However, such setting action cannot occur inasmuch as the lock unit 100 is then in the locking condition disclosed in FIG. 3b, in which the support or latch sleeve 111 prevents the essential downward movement of the second body member 13 and of the upper connector 14 secured thereto. As a result, the setting force or energy imparted to the second tubular string D is only stored therein, but cannot effect setting of the well packer A, until the lock unit 100 is released.

Figure 4:
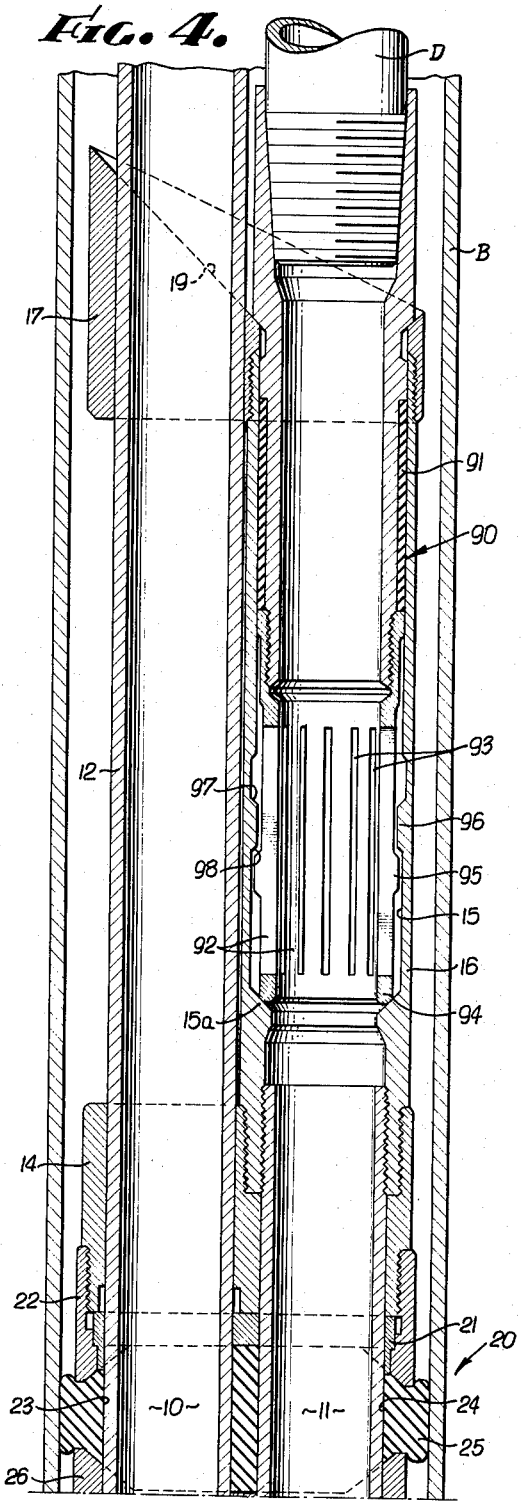
Figure 4A:
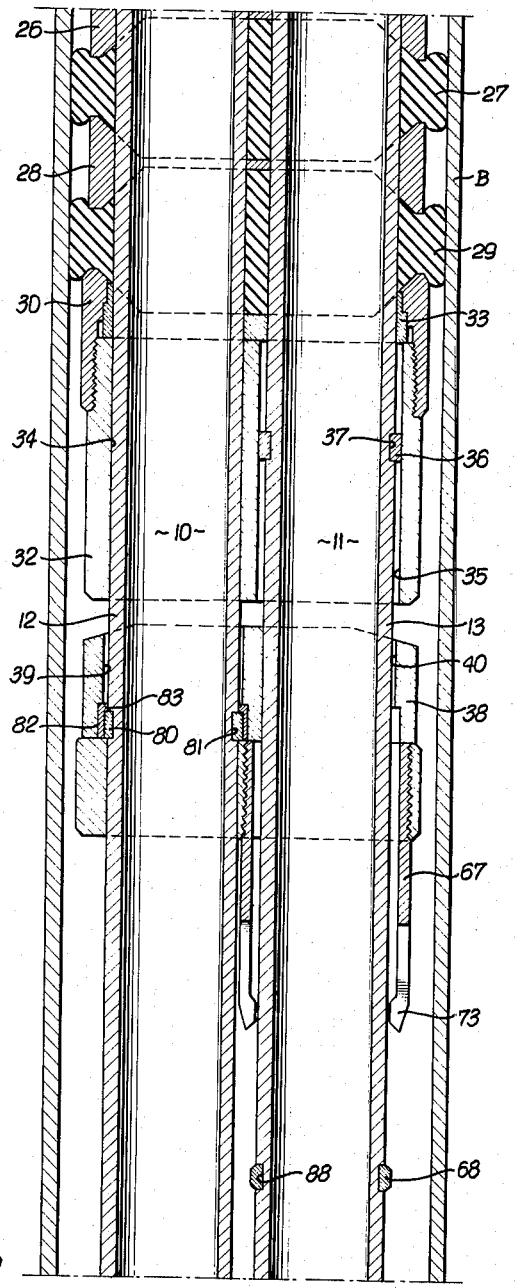

When the lock unit is to be released, the trip ball 131 is lowered or pumped down the second tubular string D and comes to rest upon its finger seat 126. Sufficient pressure is then imposed on the fluid in the second tubular string D to shear the screw 129, whereupon such pressure shifts the ball and holding sleeve 122 downwardly, removing the latter from its position behind the latch fingers 117 of the support sleeve 111. The energy stored in the second tubular string D can then effect inward camming of the latch fingers 117 by virtue of the slope of the housing flange 120, the latch sleeve shifting downwardly within the housing 109 and allowing the second body member 13 to be shifted downwardly relative to the first body member 12 for the purpose of shifting the first connector 14 toward the slip ring 38, thereby releasing at least some of the energy stored in the second tubular string D, which will effect setting of the slips 57 and of the packing structure 20 against the well casing B (FIGS. 4, 4a, 4b). Such action of the second tubular string D can occur without any movement of its upper end at the top of the well bore. In fact, after the energy has been stored in the second tubular string D, and prior to release of the lock unit 100, both the first and second tubular strings C, D can be firmly connected to a suitable Christmas tree, or the like, and such connection need not, thereafter, be varied or disrupted. It is, therefore, possible to complete a well by making appropriate surface connections with the tubing strings C, D before setting of the packer apparatus A, the well being properly conditioned without disturbing the surface connections before the well packer A is packed-off, the subsequent pack-off or full setting of the well packer being accomplished without disturbing the surface connections. One method of completing a multiple production zone well is shown diagrammatically in FIGS. 9 to 13, inclusive.

As shown in FIGS. 9 to 13, inclusive, a lower well packer P, which may be of any type, either permanently anchored or retrievable, is anchored in packed-off condition in the well casing B above the lower set of perforations 1. A tail pipe 150 of an appropriate length is connected to the first body member 12, so that, when mounted within the lower packer P, the upper packer A will be disposed above the upper perforations u. This tail pipe 150 may have a locator device 151 thereon for seating upon the lower packer P and suitable seals 152 for sealing within the bore 153 of the lower packer.

With the lower packer P set in place, the upper packer A, with the tail pipe 150 of appropriate length secured to its first body member 12, is lowered in the well casing B on the first tubular string C until the lower end of the tail pipe enters the passage 153 in the lower packer with its locating element 151 resting upon the upper portion of the lower packer, such as disclosed in FIG. 9. This advises the operator that the lower packer has been reached. The second tubular string D is now run in the well casing alongside the first tubular string C, engaging the guide 19 and being directed thereby into the receptacle 16. The required lengths of the tubular strings are now known definitely. The second tubular string D may be elevated to remove its lower portion from the receptacle 16 and both tubular strings are now elevated a particular distance, which will vary depending upon the diameter of the tubular string C and its length, as well as the length of the tail pipe 150, and also depending upon the amount of compression or stored energy that is to be later imparted to the second tubular string D. For example, the first tubular string C may be picked up about five feet, or a sufficient distance to move the seals 152 of the tail pipe out of the lower packer, such as disclosed in FIG. 10. Circulation can now be pumped down through the first tubular string C and tail pipe 150 in a volume sufficient to clear them of drilling mud, the drilling mud flowing out of the lower end of the tail pipe and then upwardly through the well casing B around the tail pipe 150 and the tubular strings C, D.

The tubular strings C, D may now be lowered slightly to insert the lower end of the tail pipe 150 partially into the lower packer, such as disclosed in FIG. 11, to dispose the locating flange 151 of the pipe 150 a desired distance above the upper end of the well packer P. The second tubular string D is then latched into the receptacle 16 in a sealed condition, such as disclosed in FIG. 3. With the first tubular string C held in tension at the top of the well bore, a desired set down weight is then imposed upon the packer A by the second tubular string D, as, for example, by allowing part of the weight of the string D to be supported by the packer A. Because of the locking action of the lock unit 100, however, the upper packer apparatus A cannot then be set, its parts all remaining in their retracted positions. The setting down of the desired weight on the second tubular string D and on the packer A will have the result of stressing the tubular string by placing its lower portion in compression and storing energy therein. The set down weight will also increase the tension in the first tubular string C and shift the tail pipe 150 downwardly within the packer, the initial spacing of the locator member 151 of the tail pipe from the upper end of the packer P being preferably predetermined so that the imposition of a predetermined set down weight or a compression force on the second tubular string D results in engagement of the locator member 151 with the top of the lower packer, without any undue compression being imposed on the tail pipe 150, which may, for example, actually possess a neutral condition, in that it is not compressed between the upper packer A and lower packer P.

The Christmas tree or surface flange equipment 180 is then installed at the top of the hole, which will include suitable valves 181, 182 controlling the flow of fluid in the first and second tubular strings C, D, as well as a valve 183 controlling the flow of fluid in the casing string B around the first and second tubular strings. The Christmas tree installation and the set down weight or storing of energy in the second tubular string D is shown diagrammatically in FIG. 12, in which the surface equipment 180 is secured to the upper portion of the tubing string D to prevent longitudinal movement of such upper portion and thereby retain the tubing string in its stressed condition. With the apparatus in the condition disclosed in FIG. 12, circulating fluid can now be pumped down the second tubular string D, to appropriately condition the well bore, such as effecting the removal of drilling mud therefrom above the lower packer P. Such drilling mud can be withdrawn since the upper well packer appratus A is in an unset or unpacked-off condition, the fluid passing out through the lower end of the housing sub 110 into the region between the packer A, P, and then flowing upwardly around the exterior of the packer A and through the well casing B around the first and second tubular strings C, D for discharge from the casing, as through the line controlled by the valve 183.

After the well has been conditioned, the trip ball 131 is pumped down the second tubular string D into engagement with the fingers 126, pressure then being imposed on the fluid in the second tubular string D to shear the screw 129 and shift the holding sleeve 122 downwardly, the fingers 126 snapping out into the circumferential recess 133 and allowing the ball 131 to be pumped out of the sub 110 and dropping harmlessly into the well bore. The stored energy in the second tubular string D will now be released at least to a major extent, the second tubular string shifting or elongating downwardly along the first tubular string C and shifting the second body member 13 downwardly relative to the first body member 12 for the purpose of setting the slips 57 and the packing structure 20 firmly against the well casing (FIG. 13).

The passage through the tail pipe 150, first body member 12, and first tubular string C is open so that fluid from the lower producing zone z can pass upwardly therethrough to the top of the well bore. Similarly, the passage through the second tubular string D, second body member 13, and lock device 100 is also open, allowing production from the upper zone y to pass through the perforations u and upwardly through the parts just referred to to the top of the well bore. The full setting of the upper packer A has occurred without disturbing the surface connections 180.

The full setting of the slips 57 and the packing structure 20 against the well casing occurs without release of all of the energies stored in the second tubular string D. As a result, the latter is constantly tending to maintain the slips anchored against the well casing and the packing structure sealed off against the well casing. In the event of any extrusion of packing material, or the like, from its sealing region against the well casing, the seal against the latter will still be effective since the second tubular string D will automatically elongate to a slight extent and maintain the packing structure fully compressed and sealed against the wall of the well casing.

In the event it is desired to retrieve the upper packer A from the well casing, the Christmas tree, or other connections at the top of the well casing, are dismantled and an upward strain taken on the second tubular string D. Such upward pull will be exerted through the latch fingers 95 upon the flange 96, shifting the body member 16 upwardly, as well as the upper connector 14 upwardly relative to the expander 32 and the slip ring 48. This will allow the packing elements 25, 27, 29 to retract inherently until the ring 36 on the second body member 13 engages the insert 33, which will then elevate the expander 32 relative to the slips 57, effecting a full retraction of the latter, at which time, the actuator ring 68 will have snapped past the feet 73 and occupied a position above the latter, such as disclosed in FIG. 3a, the well packer parts then being in retracted position. The taking of a sufficient upward strain on the second tubular string D will now cause the fingers 95 to engage the inclined surface 98 on the flange 96, causing the fingers 95 to spring inwardly free from the flange and allowing the lower portion 90 of the tubular string and its seal 91 to move upwardly from the receptacle 15. The second tubular string D may now, if desired, be removed from the well casing.

If the well packer A is to be removed from the well casing, the first tubular string C is merely elevated therewithin to carry the well packer and tail pipe 150 upwardly with it. If, however, the well packer A is not to be removed from the well casing, but the same or another second tubular string D run in the well casing, the latter is merely lowered into the well casing with its lower portion again snapped into the receptacle 15, so that its seal 91 engages the wall of the latter. The first tubular string C may be held fixed at the top of the well bore and a sufficient downward force then imposed on the second tubular string D, which will be transmitted through the shoulder 15a to the upper connector 14. Since the first body member 12 is connected to the slip ring 38, the latter cannot move. Accordingly, exertion of sufficient downward force on the second tubular string D will cause the actuator 68 to deflect the latch feet 73 outwardly, permitting the actuator 14 to move downwardly toward the slip ring 38, effecing reexpansion of the slips 57 and the packing structure 20 outwardly against the wall of the well casing. At this time, the lock unit 100 is ineffective, since it has been previously shifted to the released position illustrated in FIG. 4b.

It is, accordingly, apparent that a packer apparatus has been provided which can be preloaded, as by storing energy in a tubular string, such as the second tubular string D, which loading or storage of energy, however, cannot effect setting of the well packer A until such setting is desired. Setting action can take place after the connections 180 at the top of the well bore have been made, such connections remaining intact during the setting operation, which occurs by releasing part of the stored energy, preferably after the well has been conditioned by appropriate circulation of fluid down one of the tubular strings and upwardly through and from the casing. Thus, the well can be completed by use of an apparatus and by a mode of operating the apparatus in the well bore which insures control of the well.

We claim:

1. In a well tool adapted to be lowered in a well conduit disposed in a well bore: body means adapted to be lowered in the well conduit; normally retracted means on said body means; means on said body means engageable with said normally retracted means for expanding said normally retracted means against the well conduit; means extending to the top of the well bore and in which energy is storable for actuating said expanding means to effect expansion of said normally retracted means; releasable lock means connected to said energy storable means to prevent its stored energy from actuating said expanding means; and means for releasing said lock means to permit said energy storable means to actuate said expanding means.

2. In a well tool adapted to be lowered in a well conduit disposed in a well bore: body means adapted to be lowered in the well conduit; normally retracted means on said body means; means on said body means engageable with said normally retracted means for expanding said normally retracted means against the well conduit; means extending to the top of the well bore and in which energy is storable for actuating said expanding means to effect expansion of said normally retracted means; releasable mechanical lock means interconnecting said body means and expanding means for preventing actuation of said expanding means by said energy storable means: and means for releasing said lock means.

3. In a well tool adapted to be lowered in a well conduit disposed in a well bore: body means adapted to be lowered in the well conduit and to be operatively associated with a tubular string extending to the top of the well bore; normally retracted means on said body means; means on said body means engageable with said normally retracted means for expanding said normally retracted means against the well conduit; means extending to the top of the well bore and in which energy is storable for actuating said expanding means to effect expansion of said normally retracted means; releasable lock means connected to said energy storable means to prevent its stored energy from actuating said expanding means; and means movable down the tubular string into engagement with said lock means and responsive to fluid pressure in the tubular string for releasing said lock means.

4. In combination: a well tool to be lowered in a well conduit disposed in a well bore, including body means, normally retracted means on said body means, and means on said body means engageable with said normally retracted means for expanding said normally retracted means against the well conduit; a tubular string in the well bore extending to the top thereof and operatively connected with said well tool; means for retaining said tubular string in a stressed condition to store energy therein for actuating said expanding means to effect expansion of said normally retracted means; releasable lock means interconnecting said body means and expanding means for preventing release of said stored energy and actuation of said expanding means; and means for releasing said lock means.

5. In combination: a well tool to be lowered in a well conduit disposed in a well bore, including body means, normally retracted means on said body means, and means on said body means engageable with said normally retracted means for expanding said normally retracted means against the well conduit; a tubular string in the well bore extending to the top thereof and operatively connected with said well tool; means for retaining said tubular string in a stressed condition to store energy therein for actuating said expanding means to effect expansion of said normally retracted means; releasable lock means interconnecting said body means and expanding means for preventing release of said stored energy and actuation of said expanding means; and means movable down said tubular string into engagement with said lock means and responsive to fluid pressure in said tubular string for releasing said lock means.

6. In combination: a well tool to be lowered in a well conduit disposed in a well bore, including body means, normally retracted means on said body means, and means on said body means engageable with said normally retracted means for expanding said normally retracted means against the well conduit upon relative longitudinal movement between said body and expanding means; a tubular string in the well bore extending to the top thereof and operatively connected to said body means; means for retaining said tubular string in a stressed condition to store energy therein for shifting said body means relative to said expanding means; releasable lock means interconnecting said body means and expanding means for preventing said stressed tubular string from shifting said body means relative to said expanding means; and means for releasing said lock means.

7. In a well tool adapted to be lowered in a well conduit disposed in a well bore: body means adapted to be lowered in the well conduit and having a plurality of passages therethrough; said body means having means thereon for connecting said body means to individual tubular strings extending to the top of the well bore and communicating individually with said passages; normally retracted means on said body means; means on said body means engageable with said normally retracted means for expanding said normally retracted means against the well conduit; means in which energy is storable for actuating said expanding means to effect expansion of said normally retracted means; releasable lock means connected to said energy storable means to prevent its stored energy from actuating said expanding means; and means for releasing said lock means to permit said energy storable means to actuate said expanding means.

8. In combination: a well tool to be lowered in a well conduit disposed in a well bore, including body means having a plurality of passages therethrough, normally retracted means on said body means, and means on said body means engageable with said normally retracted means for expanding said normally retracted means against the well conduit; a plurality of tubular strings in the well bore extending to the top thereof and operatively connected to said body means in communication with said body passages; means for retaining at least one of said tubular strings in a stressed condition to store energy therein for actuating said expanding means to effect expansion of said normally retracted means; releasable lock means interconnecting said body means and expanding means for preventing release of said stored energy and actuation of said expanding means; and means for releasing said lock means.

9. In combination: a well tool to be lowered in a well conduit disposed in a well bore, including body means having a plurality of passages therethrough, normally retracted means on said body means, and means on said body means engageable with said normally retracted means for expanding said normally retracted means against the well conduit; a plurality of tubular strings in the well bore extending to the top thereof and operatively connected to said body means in communication with said body passages; means for retaining at least one of said tubular strings in a stressed condition to store energy therein for actuating said expanding means to effect expansion of said normally retracted means; releasable lock means interconnecting said body means and expanding means for preventing release of said stored energy and actuation of said expanding means; and means movable down one of said tubular strings into engagement with said lock means and responsive to fluid pressure in said one tubular string for releasing said lock means.

10. In combination: a well tool to be lowered in a well conduit disposed in a well bore, including body means having a plurality of longitudinal passages therethrough, normally retracted means on said body means, and means on said body means engageable with said normally retracted means for expanding said normally retracted means against the well conduit upon relative longitudinal movement between said body means and expanding means; individual tubular strings in the well bore extending to the top thereof and operatively connected to said body means in communication with individual passages of said body means; means for retaining at least one of said tubular strings in a stressed condition to store energy therein for shifting said body means relative to said expanding means; releasable lock means interconnecting said body means and expanding means for preventing said stressed tubular string from shifting said body means relative to said expanding means; and means for releasing said lock means.

11. In combination: a well tool to be lowered in a well conduit disposed in a well bore, including generally parallel first and second tubular body members, normally retracted means on said body members, means connected to one of said body members and engageable with said normally retracted means for expanding said normally retracted means against the well conduit in response to relative longitudinal movement between said body members; individual first and second tubular strings in the well conduit extending to the top of the well bore and connected to said first and second body members, respectively; means for retaining one of said tubular strings in a stressed condition, whereby said stressed tubular string has energy stored in it tending to shift the body member connected thereto relative to said other body member to expand said normally retracted means; releasable lock means interconnecting said body members to prevent their relative shifting; and means for releasing said lock means.

12. In combination: a well tool to be lowered in a well conduit disposed in a well bore, including generally parallel first and second tubular body members, normally retracted means on said body members, means connected to one of said body members and engageable with said normally retracted means for expanding said normally retracted means against the well conduit in response to relative longitudinal movement between said body members; individual first and second tubular strings in the well conduit extending to the top of the well bore and connected to said first and second body members, respectively; means for placing one of said tubular strings in tension and the other of said tubular strings in compression to store energy therein tending to shift said body members with respect each other to expand said normally retracted means; releasable lock means interconnecting said body members to prevent their relative shifting; and means for releasing said lock means to allow said tubular string in compression to elongate downwardly and shift said body members longitudinally of each other to expand said normally retracted means.

13. In combination: a well tool to be lowered in a well conduit disposed in a well bore, including generally parallel first and second tubular body members, normally retracted means on said body members, means connected to one of said body members and engageable with said normally retracted means for expanding said normally retracted means against the well conduit in response to relative longitudinal movement between said body members; individual first and second tubular strings in the well conduit extending to the top of the well bore and connected to said first and second body members, respectively; means for placing said first tubular string in tension and said second tubular string in compression tending to shift said second body member downwardly of said first body member to expand said normally retracted means; releasable lock means interconnecting said body members to permit such downward shifting of said second body member; and means adapted to move down through said second tubular string into engagement with said lock means and responsive to the pressure of fluid in said second tubular string to release said lock means and allow said second tubular string to elongate downwardly and shift said second body member downwardly relative to said first body member to expand said normally retracted means.

14. The method of installing a well packer in a well bore, comprising lowering the well packer in the well bore, the packer having a releasable lock preventing the well packer from being set, operatively connecting a tubular string therewith which extends from the packer to the top of the well bore, imparting energy to said tubular string by stressing it sufficiently to set said packer in the well bore, installing a well head assembly at the top of the well bore and connecting said assembly in final position to said tubular string to control fluid flow therethrough and to prevent movement of the upper portion of said tubular string; and releasing said lock to release the energy in said tubular string whereby said tubular string sets said packer without movement of the upper portion of said tubular string.

15. The method of installing a well packer in a well bore, comprising lowering the well packer in the well bore, the packer having a releasable lock preventing setting of the well packer, operatively connecting a tubular string to the well packer which extends from the packer to the top of the well bore, placing said tubular string in sufficient compression to set said packer in the well bore, installing a well head assembly at the top of the well bore and connecting said assembly in final position to said tubular string to control fluid flow therethrough and to prevent movement of the upper portion of said tubular string; and releasing said lock to allow downward elongation of said tubular string whereby said tubular string sets said packer without movement of the upper portion of said tubular string.

16. The method of installing a well packer in a well bore, comprising lowering the well packer in the well bore, the packer having a releasable lock preventing the well packer from being set, operatively connecting a plurality of tubular strings with said packer which extend to the top of the well bore, imparting energy to at least one of said tubular strings by stressing it sufficiently to set said packer in the well bore, installing a well head assembly at the top of the well bore and connecting said assembly in final position to said tubular strings to control fluid flow therethrough and to prevent movement of the upper portions of said tubular strings, and releasing said lock to release the energy in said one tubular string whereby said one tubular string sets said packer without movement of the upper portions of said tubular strings.

17. The method of installing a well packer in a well bore, comprising lowering the well packer in the well bore, the packer having a releasable lock preventing the well packer from being set, operatively connecting a plurality of tubular strings with said packer which extend to the top of the well bore, imparting sufficient compression to at least one of said tubular strings to set said packer in the well bore, installing a well head assembly at the top of the well bore and connecting said assembly in final position to said tubular strings to control fluid flow therethrough and to prevent movement of the upper portions of said tubular strings, and releasing said lock to allow downward elongation of said one tubular string whereby said one tubular string sets said packer without movement of the upper portion of said tubular strings.

18. The method of installing a well packer in a well bore, comprising lowering the well packer in the well bore, the packer having a releasable lock preventing the well packer from being set, operatively connecting a plurality of tubular strings with said packer which extend to the top of the well bore, placing one of said tubular strings in tension and another of said tubular strings in compression sufficient to set said packer in the well bore, installing a well head assembly at the top of the well bore and connecting said assembly in final position to said tubular strings to control fluid flow therethrough and to prevent movement of the upper portions of said tubular strings, and releasing said lock to allow downward elongation of said tubular string in compression whereby said tubular string in compression sets said packer without movement of the upper portions of said tubular strings.

19. The method of installing a well packer in a well bore, comprising lowering the well packer in the well bore, the packer having a releasable lock preventing the well packer from being set, operatively connecting a plurality of tubular strings with said packer which extend to the top of the well bore, placing a first tubular string in tension and a second tubular string in compression sufficient to set said packer in the well bore, installing a well head assembly at the top of the well bore and connecting said assembly in final position to said tubular strings to control fluid flow therethrough and to prevent movement of the upper portions of said tubular strings, circulating fluid through one of said tubular strings and around the exterior of the unset packer, and releasing said lock to release the energy in said second tubular string whereby said second tubular string sets said packer without movement of the upper portions of said tubular strings.

References Cited by the Examiner

UNITED STATES PATENTS

| | | | |
|---|---|---|---|
| 2,315,921 | 4/43 | Baker | 166—193 X |
| 2,707,999 | 5/55 | Ragan | 166—237 X |
| 2,903,066 | 9/59 | Brown | 166—189 X |
| 2,950,761 | 8/60 | Brown et al. | 166—189 X |
| 2,965,173 | 12/60 | Brown | 166—46 |
| 2,989,121 | 6/61 | Brown | 166—46 |
| 3,094,168 | 6/63 | Myers | 166—118 |

CHARLES E. O'CONNELL, *Primary Examiner.*